(12) United States Patent
Souki et al.

(10) Patent No.: US 6,768,215 B2
(45) Date of Patent: Jul. 27, 2004

(54) HIGH ROTATIONAL SPEED OPTIMIZED ENGINE STARTER HAVING CLUTCH CONNECTION TO ENGINE

(75) Inventors: Takahiro Souki, Handa (JP); Akira Kato, Anjo (JP); Masaru Kamiya, Toyoake (JP); Keisuke Tani, Kariya (JP); Kazuo Masaki, Chita (JP)

(73) Assignee: Denso Corporation, Kariya (JP)

( * ) Notice: Subject to any disclaimer, the term of this patent is extended or adjusted under 35 U.S.C. 154(b) by 70 days.

(21) Appl. No.: 10/209,909

(22) Filed: Aug. 2, 2002

(65) Prior Publication Data

US 2003/0048014 A1 Mar. 13, 2003

(30) Foreign Application Priority Data

Sep. 13, 2001 (JP) .................................... 2001-277670
Apr. 26, 2002 (JP) .................................... 2002-126718

(51) Int. Cl.[7] .......................... H02P 9/04; F02N 11/00; F02N 17/02; F02D 7/00
(52) U.S. Cl. .................. 290/10; 290/38 R; 290/40 C; 290/46; 290/51; 310/114; 310/78
(58) Field of Search ............................ 290/7–10, 38 R, 290/40 C, 40 R, 46, 51; 310/78, 114

(56) References Cited

U.S. PATENT DOCUMENTS

| 1,375,576 | A | | 4/1921 | Duca ........................... 192/44 |
|---|---|---|---|---|
| 3,693,231 | A | * | 9/1972 | Scharf .......................... 29/563 |
| 3,991,734 | A | * | 11/1976 | Martin ................... 123/179.19 |
| 4,073,016 | A | * | 2/1978 | Koll ........................... 5/81.1 C |
| 4,104,927 | A | * | 8/1978 | Jensen et al. ........... 123/185.14 |
| 4,125,037 | A | * | 11/1978 | Palmer et al. ................. 475/66 |
| 4,136,329 | A | * | 1/1979 | Trobert ........................ 340/459 |
| 4,192,279 | A | * | 3/1980 | Maisch et al. ............ 123/198 F |
| 4,346,773 | A | * | 8/1982 | Hofbauer et al. ............ 180/165 |

(List continued on next page.)

FOREIGN PATENT DOCUMENTS

EP  1 052 400 A2   11/2000   ........... F02N/11/08

Primary Examiner—Karl Tamai
Assistant Examiner—Pedro J. Cuevas
(74) Attorney, Agent, or Firm—Oliff & Berridge, PLC

(57) ABSTRACT

In an engine starter of the present invention, a driving shaft to output a rotating force and a crankshaft of an engine are linked continuously. The engine starter comprises a one-way clutch to prevent an overrun of an armature after the engine starts. In the one-way clutch, a connecting rotation number in which an inner ring and an outer ring change from a disconnected state to a connected state in a decreasing process of engine revolutions is set above a lower limit of the engine revolutions above which the engine under suspension of the fuel supply is able to get restarted by itself by resuming of fuel supply. Therefore, the engine is always able to get restarted quickly even in a low-rotation range.

17 Claims, 3 Drawing Sheets

U.S. PATENT DOCUMENTS

| | | | | |
|---|---|---|---|---|
| 4,362,133 | A | * 12/1982 | Malik | 477/99 |
| 4,364,343 | A | * 12/1982 | Malik | 123/179.4 |
| 4,454,843 | A | * 6/1984 | Uchida et al. | 123/179.4 |
| 4,481,425 | A | * 11/1984 | Hori et al. | 290/51 |
| 4,482,812 | A | * 11/1984 | Hori et al. | 290/38 R |
| 4,487,174 | A | * 12/1984 | Isozumi | 123/179.22 |
| 4,494,497 | A | * 1/1985 | Uchida et al. | 123/179.4 |
| 4,510,396 | A | * 4/1985 | Uchida et al. | 290/30 R |
| 4,721,083 | A | * 1/1988 | Hosaka | 477/111 |
| 4,929,218 | A | * 5/1990 | Clough | 474/83 |
| 4,949,993 | A | * 8/1990 | Stark et al. | 482/52 |
| 4,952,196 | A | * 8/1990 | Chilcote et al. | 474/70 |
| 5,126,582 | A | * 6/1992 | Sugiyama | 290/46 |
| 5,132,604 | A | * 7/1992 | Shimane et al. | 322/10 |
| 5,267,433 | A | * 12/1993 | Burch | 60/788 |
| 5,349,814 | A | * 9/1994 | Ciokajlo et al. | 60/226.1 |
| 5,354,245 | A | * 10/1994 | Wallace | 475/207 |
| 5,959,385 | A | 9/1999 | Kato et al. | 310/112 |
| 5,977,646 | A | * 11/1999 | Lenz et al. | 290/40 C |
| 6,008,606 | A | * 12/1999 | Arai et al. | 318/431 |
| 6,258,008 | B1 | * 7/2001 | Tabata et al. | 477/107 |
| 6,275,759 | B1 | * 8/2001 | Nakajima et al. | 701/54 |
| 6,307,277 | B1 | * 10/2001 | Tamai et al. | 290/40 C |
| 6,311,663 | B2 | * 11/2001 | Gracyalny et al. | 123/185.14 |
| 6,380,701 | B1 | * 4/2002 | Kahlon et al. | 318/139 |
| 6,394,208 | B1 | * 5/2002 | Hampo et al. | 180/65.2 |
| 6,396,165 | B1 | * 5/2002 | Nagano et al. | 307/10.6 |
| 6,469,402 | B2 | * 10/2002 | Morimoto et al. | 290/40 C |
| 6,483,197 | B1 | * 11/2002 | Masberg et al. | 290/40 C |
| 6,492,741 | B1 | * 12/2002 | Morimoto et al. | 290/40 C |
| 6,526,931 | B1 | * 3/2003 | Vilou | 123/179.4 |
| 6,593,713 | B2 | * 7/2003 | Morimoto et al. | 318/139 |
| 6,612,386 | B2 | * 9/2003 | Tamai et al. | 180/65.4 |
| 6,617,704 | B2 | * 9/2003 | Tomikawa | 290/40 C |
| 6,672,267 | B2 | * 1/2004 | Souki et al. | 123/179.3 |

* cited by examiner

HIGH ROTATIONAL SPEED OPTIMIZED ENGINE STARTER HAVING CLUTCH CONNECTION TO ENGINE

CROSS REFERENCE TO RELATED APPLICATION

This application is based on and incorporates herein by reference Japanese Patent Application No. 2001-277670 filed Sep. 13, 2001 and Japanese Patent Application No. 2002-126718 filed Apr. 26, 2002.

BACKGROUND OF THE INVENTION

1. Field of the Invention

The present invention relates to an engine starter mounted on a vehicle that has an automatic system to turn off the engine by suspending fuel supply to the engine when some predetermined conditions are met while the vehicle is running, for instances, in a constant running or in a decelerating running.

2. Description of Related Art

Conventionally, there has been a system to suspend fuel supply to the engine to reduce fuel consumption when some predetermined conditions are met while a vehicle is in a constant running or in a decelerating running. However, such a system suspends the fuel supply only when the number of the engine revolutions is within a predetermined range. If the engine revolutions fall below the predetermined range, the system resumes the fuel supply to prevent an engine stall. In this case, the engine under suspension of the fuel supply has to maintain certain revolutions to get restarted by itself when the fuel supply is resumed. Therefore, there has been a limit to the reduction of fuel consumption.

On the other hand, the engine has to be restarted by an engine starter when the fuel supply has been suspended in order to reduce the fuel consumption further until the engine revolutions fall into the range where the engine is not able to get restarted by itself by resuming of the fuel supply.

However, a pinion-plunging type starter, which is popular as an engine starter, is not able to start the engine while the engine is revolving. Therefore, the pinion-plunging type starter restarts the engine after the engine stops its revolution. As a result, starting response of the engine is not satisfactory.

Given the factors, as one of the engine starters that enables restarting of the engine during it is revolving, such a starter is known that starts the engine through a means for transmitting power such as a belt, as is disclosed in the U.S. Pat. No. 5,959,385 for instance.

The above engine starter has a one-way clutch to prevent an overrun of an armature, an excessive rotation of the armature forced by the engine, because a driving shaft outputting rotation of a motor is linked continuously with a crankshaft of the engine through a belt. In order to prevent the overrun of the armature, the one-way clutch breaks the power transmission by cutting off the linkage between the driven side (the driving shaft side) and the driving side (the motor side) if the rotation of the driven side surpasses the rotation of the driving side, after the engine starts.

However, if the number of the engine revolutions in which the one-way clutch is disconnected is below the lower limit of the engine revolutions above which the engine is able to get restarted by itself by resuming of the fuel supply, there exists a range where the engine is not able to get restarted by itself, nor by the starter. In this case, the engine has to wait to get restarted until the engine revolutions fall enough for the one-way clutch to get connected and to transmit power. Therefore, the engine still has a disadvantage in respect to the starting response.

SUMMARY OF THE INVENTION

It is therefore an object of the present invention to provide an engine starter able to start an engine quickly even in a range where the engine under suspension of fuel supply is not able to get restarted by itself by resuming of the fuel supply.

An engine starter according to an embodiment of the present invention comprises a motor to generate a rotating force to start the engine and a power transmission structure to transmit the rotation of the motor to a crankshaft of the engine through a clutch.

The clutch is set so that an upper limit of engine revolutions below which a driving member and a driven member are able to change from a disconnected state to a connected state surpasses a lower limit of the engine revolutions above which the engine under suspension of fuel supply is able to get restarted by itself by resuming of the fuel supply in a decreasing process of the engine revolutions. The upper limit of the engine revolutions below which the driving member and the driven member are able to change from a disconnected state to a connected state is referred to as the connecting rotation number ($N_c$) hereafter. The lower limit of the engine revolutions above which the engine under suspension of fuel supply is able to get restarted by itself by resuming of the fuel supply is referred to as the minimum rotation number for a self-restart ($N_{min}$) hereafter.

In this construction, when the engine is to be restarted, for instance, to accelerate the vehicle after the fuel supply is stopped, the engine is able to get restarted by itself by resuming of the fuel supply if the number of the engine revolutions has been ensured enough for the engine to get restarted by itself by resuming of the fuel supply.

In addition, the engine is able to get restarted by the engine starter before the number of the engine revolutions falls to $N_{min}$, since $N_c$ is set above $N_{min}$ as is explained above. Therefore, the engine is restarted quickly even in the range where the engine under suspension of the fuel supply is not able to get restarted by itself by resuming of the fuel supply. As a result, a high starting response is ensured.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE REFERRED EMBODIMENT

Embodiments of the present invention will be explained below based on drawings.

(First Embodiment)

Figure 1:
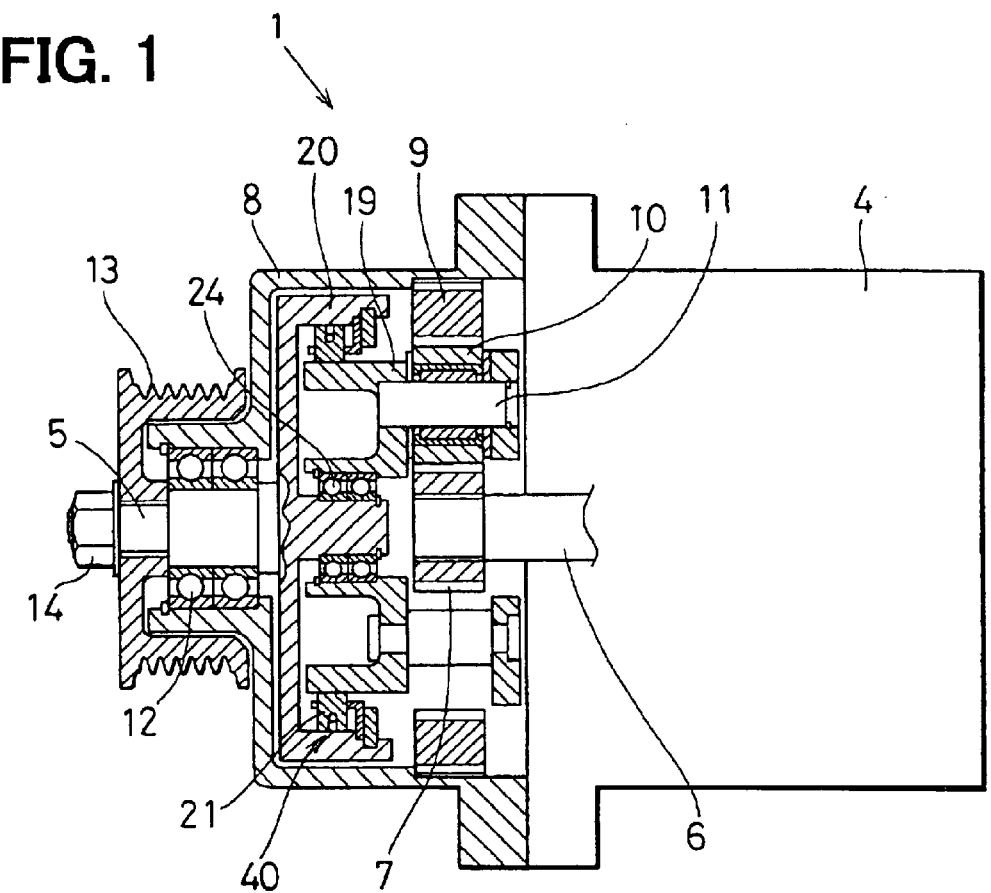
FIG. 1 is a cross-sectional view showing an inner structure of an engine starter according to a first embodiment of the present invention, except a motor.

In the first embodiment shown in FIG. 1, an engine starter 1 is described. The engine starter 1 is mounted on a vehicle that has a system to suspend fuel supply to an engine 2 automatically when predetermined conditions to turn off the engine 2 are met while the vehicle is running.

Figure 2:
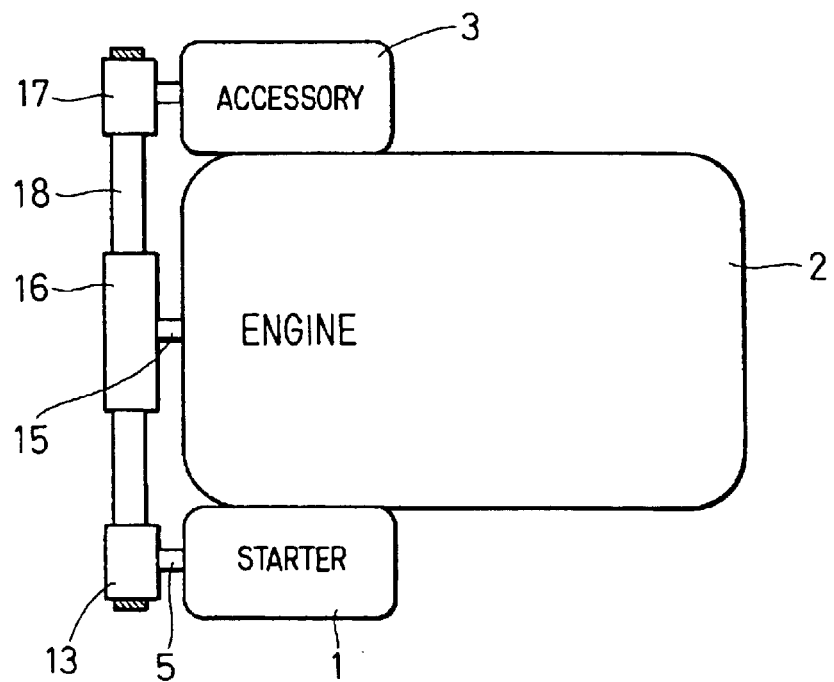
FIG. 2 is a schematic view showing a power transmission system according to the first embodiment of the present invention.

As shown in FIG. 2, the engine starter 1 is not only used to start the engine 2 but also used to drive accessories 3 (a generator, a compressor for an air conditioner and the like) while the engine 2 is not operated.

The engine starter 1 comprises a motor 4 to generate a rotating force to start the engine 2, a reduction structure (described below) to transmit the rotation of the motor 4 in reduced speeds and increased torque, a driving shaft 5 to output the rotation reduced by the reduction structure, a clutch 40 (described after) disposed between the reduction structure and the driving shaft 5, and the like.

The motor 4 is a common direct-current motor in which an armature is housed. The armature is supplied with current and generates a rotating force. The motor 4 may also be a rotating machine such as an alternating-current motor other than a direct-current motor.

The reduction structure is a planetary gear type reduction device that comprises a sun gear 7 formed on an armature shaft 6 of the motor 4, an internal gear 9 fastened to the inner periphery of a housing 8 so as to face the sun gear 7 radially, a plurality of planetary gears 10 meshed with the sun gear 7 and the internal gear 9 therebetween, and the like. In the reduction structure, when the sun gear 7 is rotated by rotation of the armature, a plurality of the planetary gears 10 revolves around the sun gear 7 while rotating respectively. The revolutions of the planetary gears 10 are transmitted as a rotating force to pins 11 in a reduced rotating speed slower than that of the armature, the pins 11 holding the planetary gears 10 as axes thereof.

The driving shaft 5 is disposed coaxially with the armature shaft 6 and is rotatably held by the housing 8 through a bearing 12. A driving pulley 13 is fastened on the end of the driving shaft 5 by a nut 14 so that the driving pulley 13 is able to rotate together with the driving shaft 5. The driving shaft 5 is linked with a crankshaft 15 of the engine 2 continuously through a V-belt 18 linking the driving pulley 13 fitted to the driving shaft 5, a crank pulley 16 fitted to the crankshaft 15 and a pulley 17 fitted to the accessory 3 as shown in FIG. 2.

Figure 3:
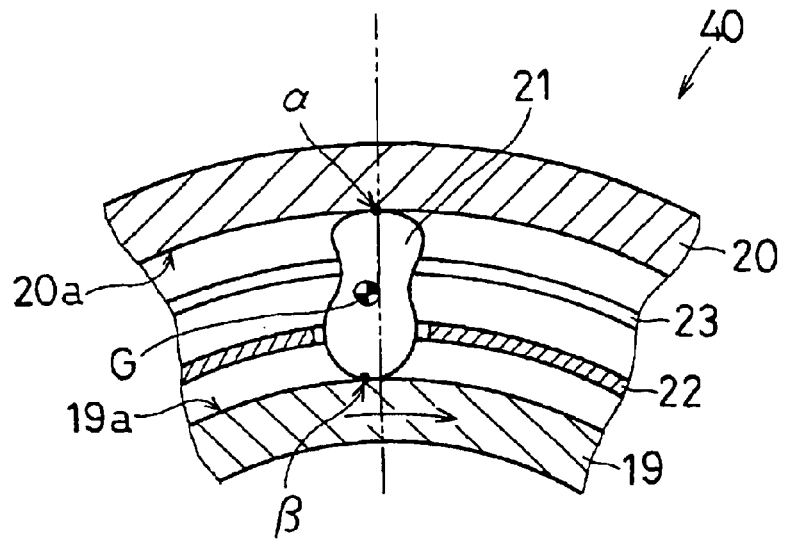
FIG. 3 is a cross-sectional view showing a construction of a one-way clutch according to the first embodiment of the present invention.

The clutch 40 comprises an inner ring 19, an outer ring 20, sprags 21, a retainer 22, a garter spring 23 and the like as shown in FIG. 3.

The inner ring 19 (a driving member in this embodiment of the present invention) is rotatably held by the other end of the driving shaft 5 through a bearing 24 as shown in FIG. 1. A plurality of the pins 11 is press-fitted into the inner ring 19. Therefore, when the armature rotates, the revolutions of the planetary gears 10 are transmitted to the inner ring 19 through the pins 11 and the inner ring 19 rotates around the driving shaft 5.

The outer ring 20 (a driven member in this embodiment of the present invention) is integrated with the driving shaft 5 (or it may also be formed apart from the driving shaft 5 and fitted to the driving shaft 5) and is disposed to face the inner ring 19 radially.

The sprag 21 (a torque transmission member in this embodiment of the present invention) is a plate body of which flat surface is formed in a generally cocoon-like shape as shown in FIG. 3. A plurality of the sprags 21 is disposed circumferentially between a torque output surface 19a of the inner ring 19 and a torque input surface 20a of the outer ring 20, respectively held by the retainer 22.

The retainer 22 holds the sprags 21 so that the sprags 21 do not change positions thereof so much, that is, so that the sprags 21 are able to move within a predetermined area.

The garter spring 23 (a biasing member in this embodiment of the present invention) is formed in a ring-shape and is inserted in grooves formed on the sprags 21. The garter spring 23 presses the sprags 21 to contact the torque output surface 19a and biases the sprags 21 in directions to attain transmission of torque.

The clutch 40 is a one-way clutch that transmits torque from the inner ring 19 to the outer ring 20 only when the inner ring 19 and the outer ring 20 form a connected state through the sprags 21. Conversely, the clutch 40 prevents the transmission of torque between the inner ring 19 and the outer ring 20 by forming a disconnected state therebetween (by canceling the connected state) when the rotation of the outer ring 20 surpasses that of the inner ring 19.

Figure 4:
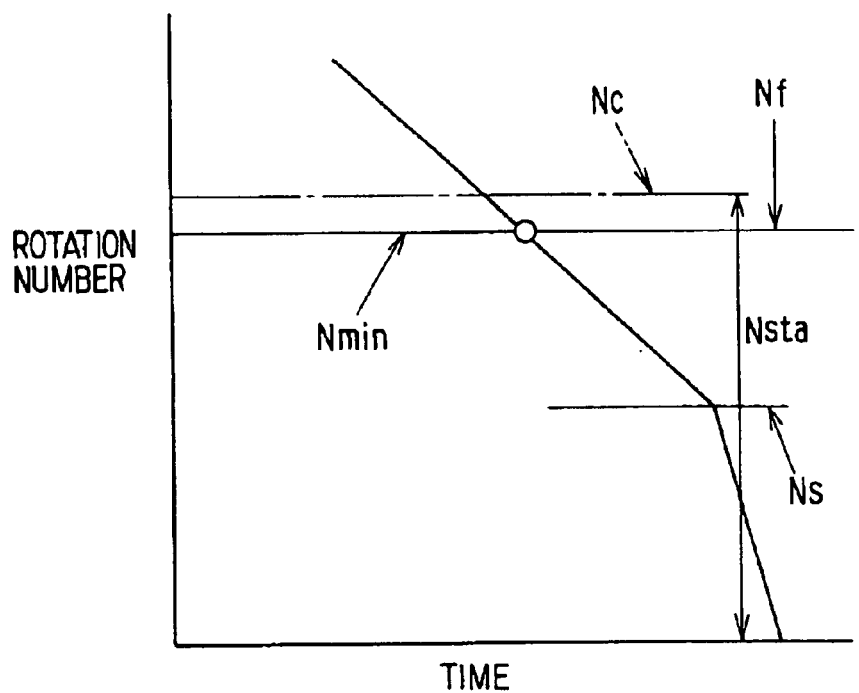
FIG. 4 is a characteristic diagram showing a relation between a minimum rotation number for a self-restart of the engine ($N_{min}$) and a connecting rotation number of the clutch ($N_c$) according to the first embodiment of the invention.

In FIG. 4, a relation between rotation number and manners to restart the engine 2 is shown.

In FIG. 4, the rotation number $N_c$ represents a connecting rotation number defined as an upper limit below which the inner ring 19 and the outer ring 20 are able to change from a disconnected state to a connected state. The rotation number $N_{min}$ represents a minimum rotation number for a self-restart defined as a lower limit of the engine revolutions above which the engine 2 under suspension of the fuel supply is able to get restarted by itself by resuming of the fuel supply. The range $N_f$ represents a range where the engine 2 is able to get restarted by itself by resuming of the fuel supply. The range $N_{sta}$ represents a range where the engine 2 is able to get restarted by the engine starter 1. The rotation number $N_s$ represents a rotation number below which the engine 2 stops fully.

When the motor 4 is supplied with current to restart the engine 2 in the decreasing process of the engine revolutions resulting from suspension of the fuel supply, linkage of the clutch 40 is connected while the outer ring 20 is rotating. The rotation number $N_c$ is set above $N_{min}$ as shown in FIG. 4.

The rotation number $N_c$ is set as a rotation number in which a centrifugal force applied to the sprag 21 by rotation of the outer ring 20 is balanced with a biasing force of the garter spring 23. Thus, the one-way clutch is constructed so that the sprags 21 are brought to the non-contacting state with the torque output surface 19a when the rotation number of the outer ring 20 is above $N_c$. At this time, the inner ring 19 and the outer ring 20 form a disconnected state, not transmitting torque.

In this construction, the non-contacting state between the sprags 21 and the torque output surface 19a is easily attained at suitable rotation numbers since the rotation number $N_c$ is set as a rotation number in which a centrifugal force applied to the sprag 21 is balanced with a biasing force of the garter spring 23, without requiring any electronic or mechanical controls.

In addition, the clutch 40 of this embodiment has a hysteresis set between $N_c$ and a disconnecting rotation number defined as a rotation number in which the inner ring 19 and the outer ring 20 change from the connected state to the disconnected state when the engine starts (in an increasing process of the engine revolutions).

The operations of the engine starter 1 will be explained below.

a) When the engine is started:

When the armature rotates with current supplied to the motor 4, the rotation of the armature is transmitted to the inner ring 19 of the clutch 40 by the reduction structure in a reduced rotating speed.

As shown in FIG. 3, when the inner ring 19 rotates in the direction of the arrow, the sprag 21 contacting the point β on the outer periphery of the inner ring 19 is applied with a moment in a counter-clockwise direction. Accordingly, the sprag 21 moves counter-clockwise within a predetermined area around the point α where the sprag 21 and the outer ring 20 contact and generate a friction resistance therebetween.

As a result, the sprags 21 come to stand up and the contact pressure among the sprags 21, the torque output surface 19a and the torque input surface 20a increases so far as the inner ring 19 and the outer ring 20 form a connected state through the sprags 21. Accordingly, the rotation of the inner ring 19 is transmitted to the outer ring 20, and the driving shaft 5 integrated with the outer ring 20 rotates. Thus, the rotating force is transmitted to the crankshaft 15 of the engine 2 to crank the engine 2 through the driving pulley 13, the V-belt 18 and the crank pulley 16.

At this moment, the rotation numbers of the inner ring 19 and the outer ring 20 are the same. After that, when the engine starts operating under its own power and the rotation number of the outer ring 20 surpasses that of the inner ring 19, the outer ring 20 rotates clockwise compared with the inner ring 19 in FIG. 3.

Accordingly, the sprag 21 moves clockwise around the point α and comes to lie down. Therefore, the contact pressure among the sprags 21, the torque output surface 19a and the torque input surface 20a is decreased and the connected state between the inner ring 19 and the outer ring 20 is cancelled (changed into the disconnected state). As a result, the transmission of torque between the inner ring 19 and the outer ring 20 is cut off and the overrun of the armature is prevented.

After that, if the engine 2 rotates faster, a centrifugal force acts on the centroid G of the sprag 21. The centrifugal force urges the sprag 21 to move clockwise around the point α, because the centroid G is deviated backward (to the left in FIG. 3) from the line crossing the point α and the axial center. Accordingly, the sprags 21 lie down more and separate from the torque output surface 19a, and the contact between the sprags 21 and the inner ring 19 is cancelled fully.

b) When the engine is to be restarted to accelerate the vehicle after the fuel supply to the engine 2 is stopped during the vehicle is running (in a constant running or in a decelerating running):

When the number of the engine revolutions is within the range in which the engine 2 is able to get restarted by itself by resuming of the fuel supply (the range above $N_{min}$ shown in FIG. 4), the engine is able to get restarted by itself by resuming of the fuel supply.

When the engine revolutions fall below $N_{min}$, the engine 2 is able to get restarted by the engine starter 1.

More specifically, the clutch 40 equipped in the engine starter 1 is set so that the rotation number $N_c$ is above $N_{min}$ in the decreasing process of the engine revolutions. Therefore, even if the engine revolutions fall below $N_{min}$ as shown in FIG. 4, linkage of the clutch 40 is able to get connected by starting the engine starter 1 (by supplying electricity to the motor 4) at that time. Accordingly, the engine 2 is able to get restarted quickly.

The engine starter 1 of this embodiment is able to maintain the connected state between the inner ring 19 and the outer ring 20 of the clutch 40 if only the number of the engine revolutions is below $N_{min}$. That is, there is no range in which the engine is not able to get restarted between $N_{min}$ and $N_c$ as shown in FIG. 4.

Therefore, the engine 2 is always able to get restarted even in the low-rotation range where the engine 2 is not able to get restarted by itself by resuming of the fuel supply (the range below $N_{min}$). As a result, a suitable starting response is ensured and the range in which the fuel supply is able to be suspended is widened, improving the fuel consumption.

In addition, since the clutch 40 in this embodiment has a hysteresis set between $N_c$ and the disconnecting rotation number, the inner ring 19 and the outer ring 20 do not repeatedly change between the connected state and the disconnected state when the engine is started (including when the engine is restarted). Accordingly, excessive shocks acting on the clutch 40 are inhibited, compared with the case in which the hysteresis is not set. If the hysteresis is not set, the inner ring 19 and the outer ring 20 may repeatedly change between the connected state and the disconnected state when the engine is started. As a result, excessive shocks may arise, damaging the clutch 40 when the clutch 40 operates, especially when the clutch 40 changes from the disconnected state to the connected state.

Moreover, transmission of torque is ensured by regarding the state in which a certain number of the sprags 21 more than a predetermined number are contacting the torque output surface 19a is the connected state when the inner ring 19 and the outer ring 20 change from the disconnected state to the connected state in the decreasing process of the engine revolutions. Therefore, the damage to the clutch 40 is inhibited, compared with the case in which it is regarded as a connected state when a small number of the sprags 21 are contacting the torque output surface 19a. If a state in which a small number (for instance, one) of the sprags 21 are contacting the torque output surface 19a is regarded as the connected state of the clutch 40, the driving torque is transmitted through the small number (for instance, one) of the sprags 21, and the clutch 40 may be damaged. It happens because the sprags 21 rarely (more strictly, do not) contact the torque output surface 19a at the same time when the inner ring 19 and the outer ring 20 change from the disconnected state to the connected state because of errors or variations generated in the process of production or assembly.

A certain number of the sprags 21 more than a predetermined number means a number of sprags 21 enough to transmit torque surely. Therefore, if torque is surely transmitted in a state in which one sprag 21 is contacting the torque output surface 19a for instance, the state (one sprag 21 is contacting the torque output surface 19a) may be regarded as the connected state.

Alternatively, the clutch 40 may be regarded as being in the connected state when the engine revolutions fall below a threshold rotation number in which all sprags 21 contact the torque output surface 19a.

Again, the rotating force of the motor 4 is suitably transmitted to the engine 2 without generating shocks in the clutch 40 by starting the motor 4 after the rotation number of the outer ring 20 falls below $N_c$ when the engine 2 is to be restarted in the decreasing process of the engine revolutions.

(Modification)

The engine starter 1 of this embodiment is described as it is not only used to start the engine 2 but also used to drive the accessories 3 during the engine 2 is not operated. Alternatively, the engine starter 1 may be used only to start the engine 2.

In this embodiment, a power transmission system by a belt transmission is explained. Alternatively, a chain, a timing belt or other kinds may also be used instead of the V-belt 18. In addition, some constructions other than a system transmitting power through a belt and the like may also be applied. Constructions that employs gears and the like to link the crankshaft 15 and the driving shaft 5 continuously may also be applied other than a power transmission system that employs a belt.

(Second Embodiment)

Figure 5:
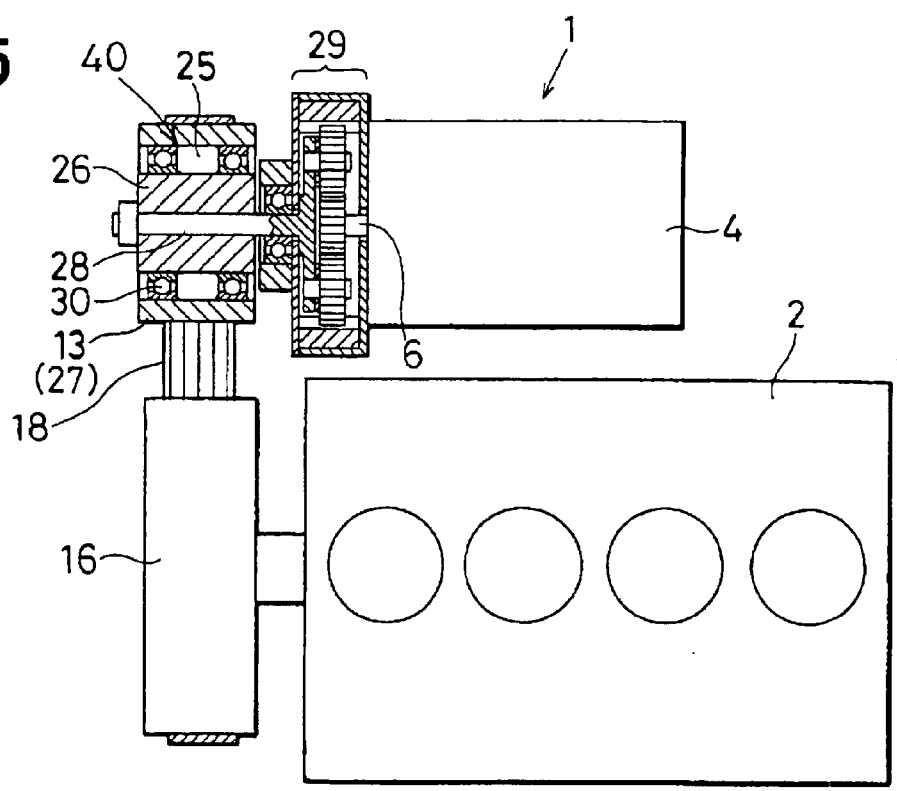
FIG. 5 is a general view showing an engine starter system according to a second embodiment of the present invention.

In the second embodiment shown in FIG. 5, an engine starter 1 is described as an example that employs a roller-type one-way clutch 40, of which construction is different from the clutch 40 described in the first embodiment. A power transmission structure employs a system that transmits power through a V-belt 18 that links a driving pulley 13 and a crank pulley 16, like in the first embodiment.

The clutch 40 has an inner member 26 and an outer member 27 disposed radially inside a driving pulley 13 as shown in FIG. 5, the inner member 26 and the outer member 27 facing each other through rollers 25. The inner member 26 is fixed on the outer periphery of a rotational shaft 28 to be able to rotate together with the rotational shaft 28. The outer member 27 is formed integrally with the driving pulley 13. The rotational shaft 28 is disposed coaxially with an output shaft of a motor 4 (an armature shaft 6) through a planetary reduction device 29. The rotation of the armature is transmitted to the rotational shaft 28 in a rotating speed reduced by the reduction device 29.

The inner member 26 and the outer member 27 are held by bearings 30 (ball bearings) disposed at the both sides of the rollers 25 in an axial direction so that the inner member 26 and the outer member 27 are able to rotate respectively.

The rollers 25 are housed in a generally wedge-shaped cam chambers formed by a torque output surface of the inner member 26 and a torque input surface of the outer member 27. The rollers 25 are pressed to contact the torque output surface and biased in directions to attain torque transmission by springs.

This clutch 40 has a hysteresis set between a connecting rotation number ($N_c$) and a disconnecting rotation number like in the first embodiment.

In the roller-type clutch 40, a connecting rotation number ($N_c$) defined as an upper limit of the rotation number below which the inner member 26 and the outer member 27 are able to change from a disconnected state to a connected state is set above the lower limit of engine revolutions above which an engine 2 under suspension of fuel supply is able to get restarted by itself by resuming of the fuel supply (the rotation number $N_{min}$). Accordingly, there is no range in which the engine 2 is not able to get started between the rotation numbers $N_{min}$ and $N_c$.

Therefore, the engine 2 is always able to get restarted even in the low-rotation range in which the engine 2 is not able to get restarted by resuming of the fuel supply (the range below $N_{min}$).

(Third Embodiment)

Figure 6:
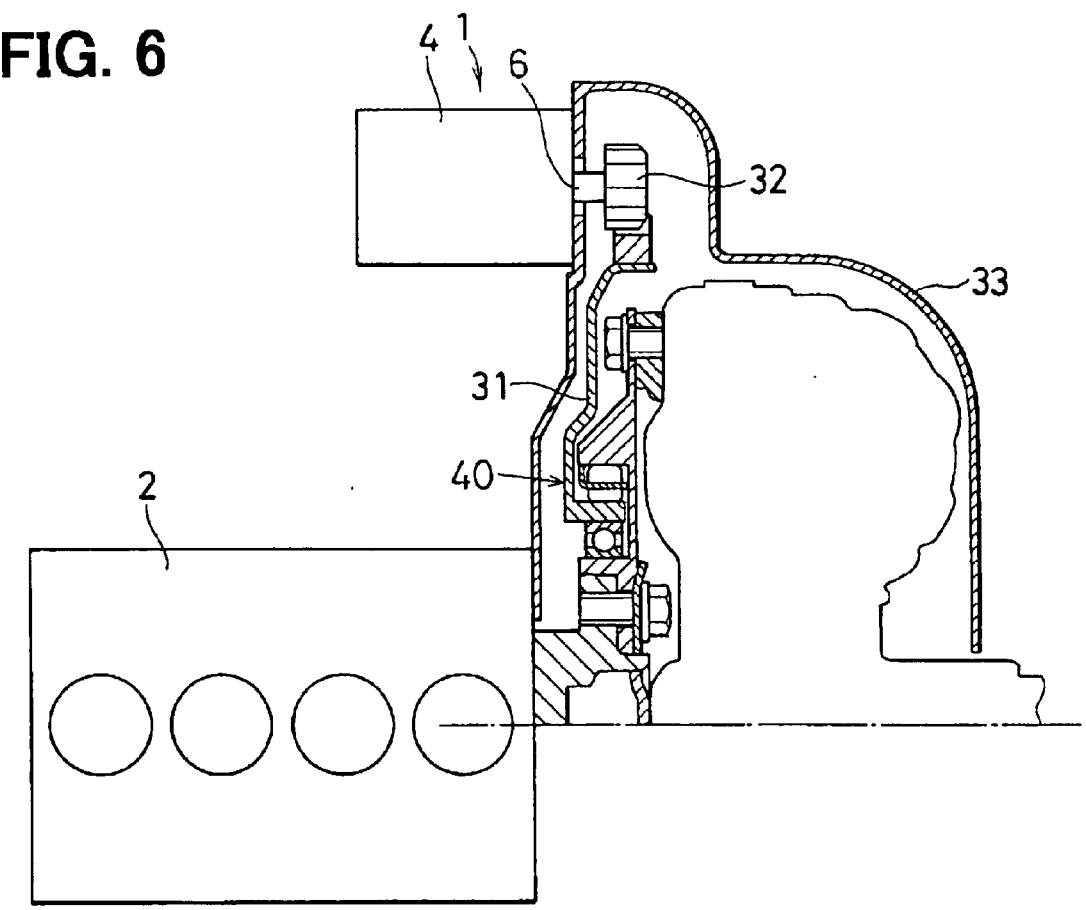
FIG. 6 is a general view showing an engine starter system according to a third embodiment of the present invention.

In the third embodiment shown in FIG. 6, an engine starter 1 is described.

The engine starter 1 is an example in which an output shaft of a motor 4 (an armature shaft 6) and a driving member 31 of a clutch 40 are linked by a gear 32 (or a torque transmission component of a belt, a chain or other kinds).

In this construction, the clutch 40 (a one-way clutch) is disposed in the side of the engine 2 (a crank pulley, a transmission case 33 and the like) not in the side of the motor 4. Accordingly, the torque transmission component such as the gear 32 linking the armature shaft 6 and the driving member 31 is stopped while the engine is not operated, which is favorable in respect of durability.

The present invention should not be limited to the disclosed embodiments, but may be implemented in many other ways without departing from the spirit of the invention.

What is claimed is:

1. An engine starter for starting an engine, the engine starter being mounted on a vehicle that has a system to suspend fuel supply to the engine automatically when predetermined conditions to turn off the engine are met, the engine starter comprising:

an electric motor to generate a rotating force to start the engine; and a power transmission structure to transmit rotation of the motor to a crankshaft of the engine through a clutch that comprises at least a driving member connected to an output shaft of the motor and a driven member linked with the crankshaft, wherein the clutch is able to transmit torque from the driving member to the driven member by forming a connected state between the driving member and the driven member and is able to cut off transmission of torque from the driving member to the driven member by forming a disconnected state between the driving member the clutch defines a connecting rotation number as an upper limit of a rotation number of the driven member below which the driving member and the driven member are able to change from the disconnected state to the connected state in a decreasing process of engine revolutions, and the connecting rotation number is set above a value corresponding to a limit of the engine revolutions above which the engine under suspension of the fuel supply is able to get restarted by itself by resuming supply of fuel without being driven by the electric motor.

2. The engine starter as in claim 1, wherein:

the clutch is a one-way clutch that forms the connected state only when the clutch transmits torque from the driving member to the driven member, and forms the disconnected state between the driving member and the driven member to prevent torque transmission from the driven member to the driving member when the rotation number of the driven member surpasses that of the driving member.

3. The engine starter as in claim 2, wherein:

the one-way clutch comprises a torque transmission member that is disposed between a torque output surface of the driving member and a torque input surface of the driven member and transmits torque from the driving member to the driven member through frictional connection with the torque output surface and the torque input surface, and a biasing member that presses the torque transmission member to contact the torque output surface and biases the torque transmission member in a direction to achieve transmission of torque; and the torque transmission member is brought to a non-contacting state with the torque output surface when the rotation number of the driven member surpasses the connecting rotation number set as a rotation number in which a centrifugal force that is caused by rotation of the driven member and acts on the torque transmission member is balanced with a biasing force of the biasing member that biases the torque transmission member.

4. The engine starter as in claim 2, wherein:

the one-way clutch has a hysteresis set between the connecting rotation number and a disconnecting rotation number in an increasing process of the engine revolutions, wherein the disconnecting rotation number is defined as a rotation number of the driven member at which the driving member and the driven member change from the connected state to the disconnected state.

5. The engine starter as in claim 2, wherein:

the one-way clutch has a plurality of torque transmission members; and the one-way clutch is formed so that a state in which a certain number of the torque transmission members more than a predetermined number are contacting a torque output surface of the driving member when the driving member and the driven member change from the disconnected state to the connected state in the decreasing process of the engine revolutions is regarded as the connected state.

6. The engine starter as in claim 1, wherein:

the motor is supplied with electric current when the rotation number of the driven member falls below the connecting rotation number, in case the engine is to be restarted after predetermined conditions to turn off the engine are met in the decreasing process of the engine revolutions.

7. The engine starter as in claim 1, wherein:

the power transmission structure comprises a planetary gear type reduction device.

8. The engine starter as in claim 1, wherein:

the power transmission structure comprises a driving pulley connected to a driving shaft of the motor, a crank pulley connected to the crankshaft and a belt linking the driving pulley and the crank pulley.

9. The engine starter as in claim 1, wherein:

the power transmission structure comprises a chain linking the driving shaft and the crankshaft.

10. The engine starter as in claim 1, wherein:

the power transmission structure comprises a timing belt linking the driving shaft and the crankshaft.

11. The engine starter as in claim 1, wherein:

the power transmission structure comprises a gear connected to the driving shaft.

12. The engine starter as in claim 2, wherein:

the one-way clutch comprises an inner ring, an outer ring facing the inner ring radially, sprags disposed between the inner ring and the outer ring, a retainer that holds the sprags so that the sprags are able to move in predetermined areas, and a garter spring that presses the sprags to contact a torque output surface of the inner ring and biases sprags in directions to achieve transmission of torque.

13. The engine starter as in claim 2, wherein:

the one-way clutch is a roller-type clutch.

14. The engine starter as in claim 2, wherein:

the one-way clutch has a plurality of torque transmission members; and the one-way clutch is formed so that a state in which all of the torque transmission members are contacting a torque output surface of the driving member when the driving member and the driven member change from the disconnected state to the connected state in the decreasing process of the engine revolutions is regarded as the connected state.

15. The engine starter as in claim 8, wherein:

the driving pulley connected to the driving shaft is further linked with a pulley of accessories of the engine through the belt so that the motor is used to drive the accessories while the engine is not operated.

16. The engine starter as in claim 1, wherein:

the decreasing process of the engine revolutions is a process for stopping the engine by suspending the fuel supply to the engine.

17. A restarting method for restarting an engine with an engine starter during an engine stopping process, the engine starter having a clutch for transmitting rotating force of an electric motor to the engine in order to start the engine when the electric motor is connected to the engine through the clutch, the restarting method comprising the steps of:

disconnecting the electric motor from the engine by the clutch when the engine revolutions exceed a value corresponding to a disconnecting rotation number of the clutch during an engine starting process;

suspending fuel supply to start the engine stopping process under a condition that the engine is disconnected from the electric motor; and connecting the electric motor to the engine by the clutch when the engine revolutions become equal to or lower than a value corresponding to a connecting rotation number of the clutch, which is higher than a rotation number of the clutch corresponding to a limit of the engine revolutions above which the engine under the suspension of the fuel supply is able to get restarted by itself by resuming of the fuel supply without being driven by the electric motor, so that the engine is restarted by the transmission of the rotating force of the electric motor and the resuming of the fuel supply to the engine.

* * * * *